United States Patent [19]

Snelling

[11] Patent Number: 4,477,175

[45] Date of Patent: Oct. 16, 1984

[54] MULTI-FUNCTION REPRODUCTION MACHINE

[75] Inventor: Christopher Snelling, Penfield, N.Y.

[73] Assignee: Xerox Corporation, Stamford, Conn.

[21] Appl. No.: 450,868

[22] Filed: Dec. 20, 1982

[51] Int. Cl.³ .............................................. G03G 15/04
[52] U.S. Cl. .................................... 355/3 R; 358/300; 355/11; 355/14 R
[58] Field of Search .............. 355/3 R, 8, 11, 1, 14 R; 101/DIG. 13; 346/153.1; 358/300

[56] References Cited

U.S. PATENT DOCUMENTS

| | | | |
|---|---|---|---|
| 3,956,587 | 5/1976 | Nelson | 178/7.6 |
| 4,046,471 | 9/1977 | Branham et al. | 355/14 |
| 4,134,668 | 1/1979 | Coburn | 355/3 R |
| 4,154,500 | 5/1979 | Funato et al. | 350/96.25 |
| 4,241,990 | 12/1980 | Fisli | 355/11 |
| 4,255,042 | 3/1981 | Armitage, Jr. et al. | 355/3 R |
| 4,268,160 | 5/1981 | Muramatsu | 355/3 R |
| 4,294,534 | 10/1981 | Snelling | 355/3 R |
| 4,320,955 | 3/1982 | Kay | 355/3 R |
| 4,330,195 | 5/1982 | Lavallee | 355/3 R |
| 4,345,835 | 8/1982 | Kramer et al. | 355/3 R |
| 4,370,055 | 1/1983 | Nishikawa et al. | 355/1 X |
| 4,394,083 | 7/1983 | Rees | 355/1 |

Primary Examiner—R. L. Moses
Attorney, Agent, or Firm—Frederick E. McMullen

[57] ABSTRACT

A multi-function printer employing a linear array of lenslets for transmitting, when in the COPY mode, image rays from the image original being copied to the moving photoreceptor of a xerographic system. To scan the image original, the platen is moved past the scan point whereat the lens array optical path intersects the platen. For operation in a READ mode, a linear reading array of photosensitive elements is disposed to one side of the optical path between the lens array and the photoreceptor, the longitudinal axis of the reading array being perpendicular to that of the lens array. A prism is inserted into the optical path to intercept the image rays transmitted by the lens array from the platen and transmit the image rays to the reading array where the image represented thereby is converted to electrical signals or pixels. For operation in a WRITE mode, a linear writing array of LEDs is disposed to one side of the optical path between the platen and the lens array, the longitudinal axis of the writing array being perpendicular to that of the lens array. A prism is inserted into the optical path to transmit image rays emitted by the writing array in response to an image signal or pixel input to the lens array and the photoreceptor.

4 Claims, 4 Drawing Figures

READ MODE

WRITE MODE

MULTI-FUNCTION REPRODUCTION MACHINE

The invention relates to a multi-function reproduction machine, and more particularly, to a multi-function reproduction machine capable of operating in a COPY mode to copy document originals, in a READ mode to scan document originals and convert the document image to electrical signals or pixels, and in a WRITE mode to generate images to be printed in response to image signals or pixels.

In the current state of the art, copiers or reproduction machines designed to produce copies of document originals, commonly referred to as convenience copiers, are widely known. The typical copier operates on the xerographic principle, the user or operator merely loading the document original, which may comprise a single page or multiple pages, into the copier automatic document handler, programming via a keyboard the number of copies desired, and then actuating a Start/Print button. The copies programmed are made, and in some of the more sophisticated copiers may even be collated and stapled together.

In a somewhat similar vein, copiers of the aforementioned type may instead be equipped with scanning signals or image pixels. In machines of this type, the high intensity beam of energy emitted by the laser is scanned across the machine photoreceptor while being modulated in accordance with the image pixels thereby exposing the photoreceptor to create and electrostatic image or likeness of the image represented by the image pixels. The electrostatic image so created is thereafter processed in the usual xerographic manner to provide a hard copy output. Machines of the foregoing type are normally referred to as printers.

Despite the above-described state of the art, machines that perform either copying or printing at the selection of the user or operator i.e., dual function machines, are not widely developed or known. And, if the third major function, that of reading document originals and converting the document image to electrical signals or pixels, is desired, the type of machine required to provide all of these functions is complex indeed and generally beyond the present state of the art.

The present invention seeks to overcome the failings and omissions of the art by providing a multi-mode reproduction machine of the xerographic type with a photoreceptor and platen for supporting a document original to be processed comprising in combination: a lens array composed of a preset number of individual lens elements arrayed in at least one row for transmitting image rays representative of the document original on the platen to the photoreceptor in a copy mode; an image writing array composed of a plurality of individually actuable illumination elements for generating line-like image ray patterns representative of image signals input thereto, first optical guide means selectively movable into the optical path to thereby transmit image rays from the image writing array through the lens array to the photoreceptor in a write mode; an image reading array composed of a plurality of image sensing elements for converting image rays from the document original on the platen to image signals; second optical guide means selectively movable into the optical path so that image rays from the document original on the platen are transmitted through the lens array to the image reading array in a read mode; and means for selectively controlling operation of the first and second optical guide means to enable copy, read, or write mode.

IN THE DRAWINGS

Figure 1:
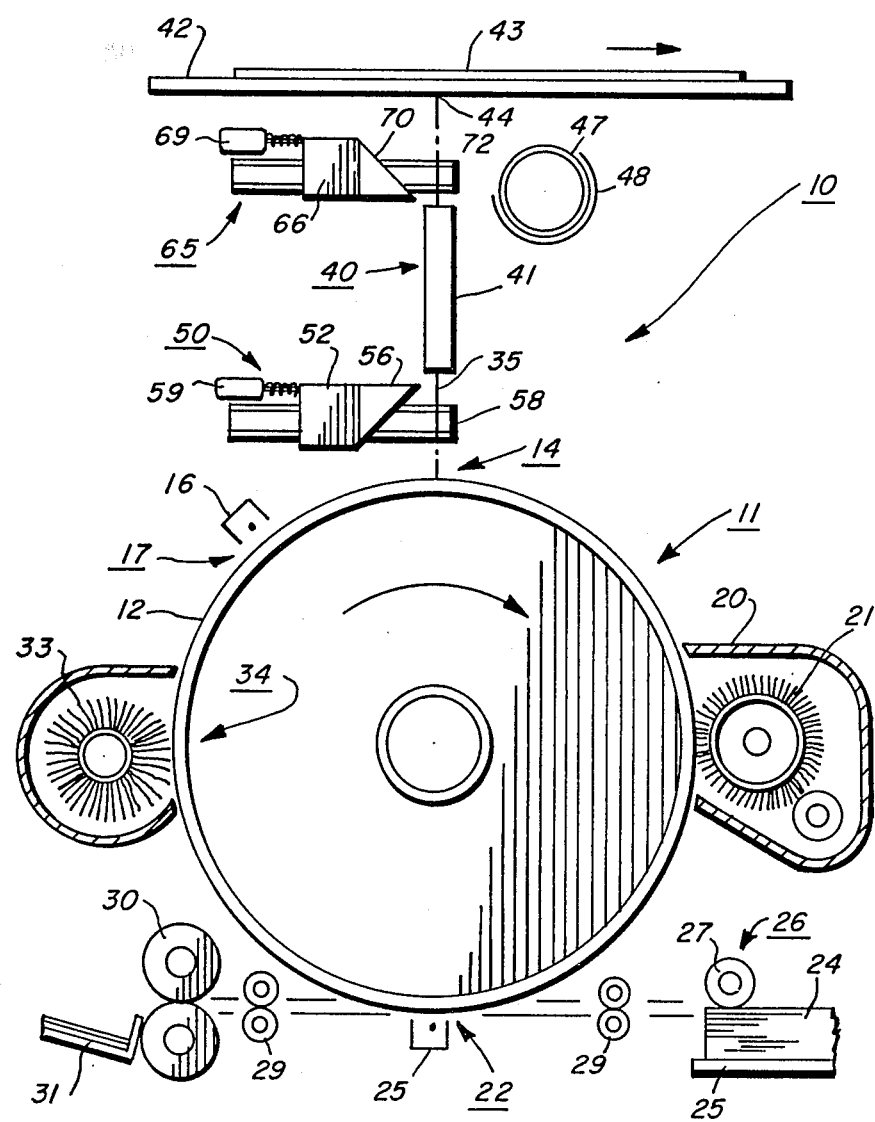
FIG. 1 is a schematic view showing the multi-mode reproduction machine of the present invention.

Referring particularly to FIG. 1 of the drawings, the multi-mode reproduction machine or printer of the present invention, which is designated generally by the numeral 10, is thereshown. As will appear, printer 10 is capable of operation in a first or COPY mode wherein a document original (designated by the numeral 43 herein) is exposed line by line to a previously charged photoreceptor of a xerographic system to create a latent electrostatic image of the document original which is thereafter developed, transferred to a suitable copy medium, and fused to provide a permanent reproduction of the document original; or in a second or READ mode wherein the document original is scanned line by line an image reading array which converts the document image to electrical signals or pixels; or in a third or WRITE mode wherein an image writing array selectively exposes the photoreceptor in accordance with an image signal or pixel input to provide, on the aforementioned copy medium, a permanent reproduction of the image represented by the image signal input.

Printer 10 includes a conventional xerographic processing system 11, the principal operating components of which includes a photoreceptor 12 in the form of a drum suitable supported for rotation within the printer housing (not shown), a charging station 17 whereat a uniform charge is placed on photoreceptor 12 by charge corotron 16, an exposure station 14 whereat the previously charged photoreceptor 12 is exposed as will appear more fully herein, a developing station 20 whereat the latent electrostatic image created on photoreceptor 12 at exposure station 14 is developed by suitable developing means illustrated herein as magnetic brush 21, a transfer station 22 whereat the image developed on photoreceptor 12 is transferred by means of transfer corotron 25 to the copy substrate material shown here in the form of a copy sheet 24, and a cleaning station 34 whereat residual developer materials are removed from the photoreceptor as by cleaning brush 33 preparatory to recharging photoreceptor 12. A supply of copy sheets 24 is provided in copy sheet tray 25, a suitable sheet feeder 26 shown herein in the form of a feed roll 27 being provided to feed one copy sheet 24 at at time forward from tray 25 to a copy sheet transport in the form of plural pinch roll pairs 29. Pinch roll pairs 29 bring the copy sheets forward to transfer station 19 in timed synchronization with rotation of photoreceptor 12 for receipt of the developed image, and following transfer of the developed image to the copy sheet, transport the image bearing copy sheet to fuser 30 where the image is fused or fixed to provide a permanent copy. Following fusing, the copy sheets are deposited in a suitable receptacle such as output tray 31.

A lens array 40 which preferably comprises a plurality of gradient optical fibers or fiber lenses 41 arranged in one or more linear arrays or rows, is provided for transmitting image rays to photoreceptor 12 at exposure station 14. Optical fibers of the type referred to herein are produced under the tradename "SELFOC", registered in Japan and owned by Nippon Sheet Glass Co., Ltd. Lenses 41 may be arranged in a plurality of parallel arrays or rows with the centerlines of the lenses in one row offset from the centerlines of the lenses in the adjoining row to enhance packing density. The longitudinal axis of the row or rows of lenses that comprise lens array 40 is substantially parallel to the scan or X direction.

For operation in the COPY and READ modes, a transparent platen 42 is provided in predetermined spaced relation to lens array 40, platen 42 serving to support the document original 43 to be scanned. The dimension of platen 42 and of lens array 40 in the scan direction (i.e. the X direction) is preferably made at least equal to the width dimension of the largest document original 43 to be processed. To provide the necessary scanning motion between lens array 40 and the document original 43, platen 42 is suitably supported for movement in the cross scan direction (i.e. the Y direction) past the point (referred to herein as scan point 44) where the system optical path 35 intersects platen 42. A suitable platen drive mechanism 46, is provided for moving platen 42 in the cross scan or Y direction past scan point 44. Other arrangements for moving the document original 43 past the scan point 44 may instead be envisioned.

A suitable lamp 47 is provided below platen 42 and adjacent scan point 44 to illuminate the scan area. Reflector 48 is provided to concentrate light emitted by lamp 47 onto the scan area.

Figure 2:
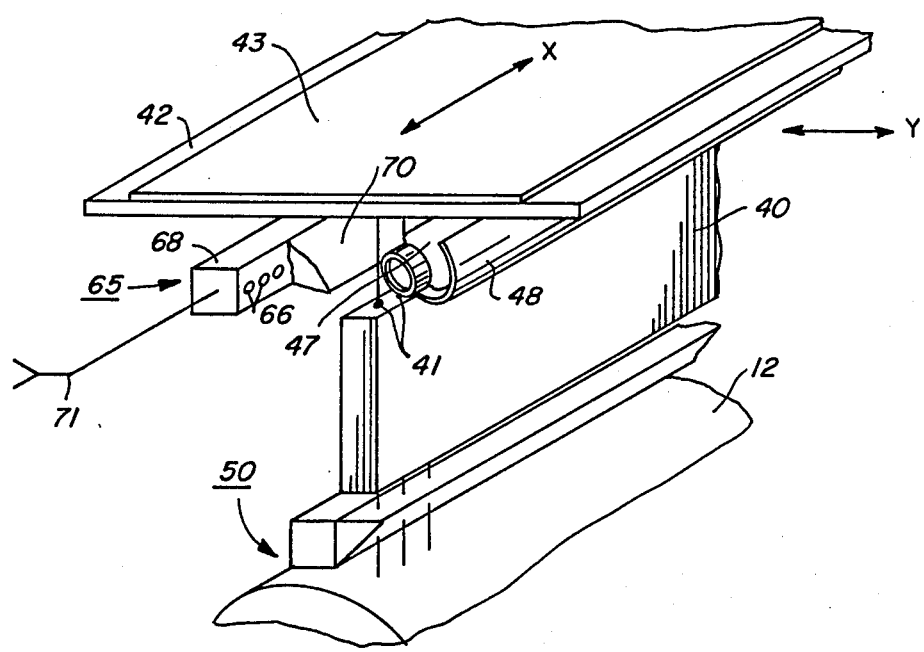
FIG. 2 is an isometric view showing coupling of the machine reading array into the optical path for operation in the READ mode.
Figure 3:
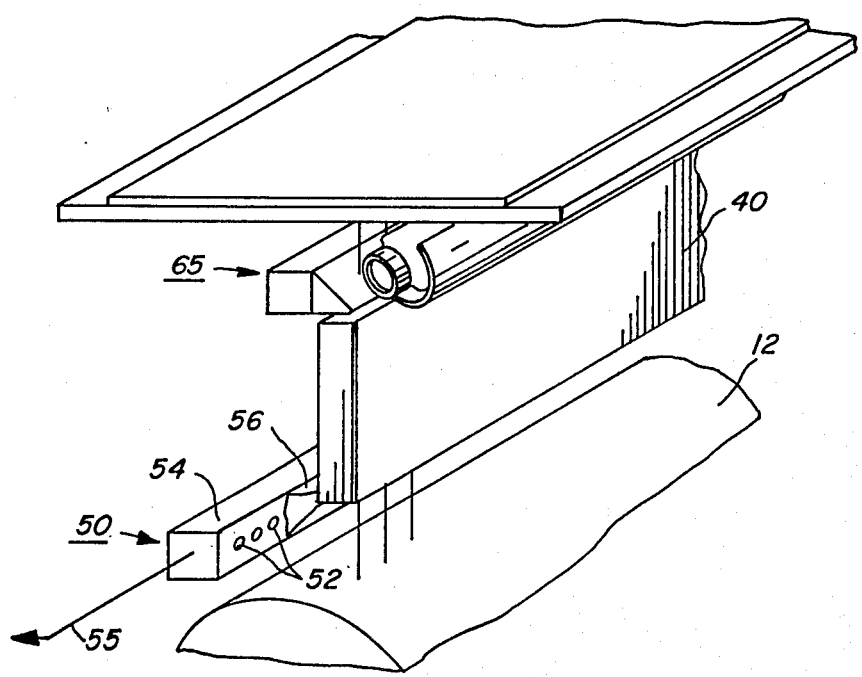
FIG. 3 is an isometric view showing coupling of the machine writing array into the optical path for operation in the WRITE mode.

For operation in the READ mode, and referring to FIGS. 1-3 of the drawings, an image reading array 50 is provided for scanning the document original on platen 42 through lens array 40. As will be understood by those skilled in the art, reading array 50 has a plurality of individual scanning elements 52 such as photosensors arranged in at least one linear array or row on a base or chip 54, the row or rows of scanning elements 52 extending along the scan or X axis to permit scanning and reading of the document original on platen 42 line by line.

As will be understood by those skilled in the art, array 50 incorporates suitable circuitry including a clock for repeatedly sampling scanning elements 52 and outputting image signals or pixels representative of the document original in a serial bit stream to an output line 55. As will be understood, line 55 transmits the image signals produced to a suitable user, as for example, a memory, a remote printer, data communication channel, etc.

A right angle prism 56 is provided at the face of reading array 50, prism 56 serving to bend or turn the image rays in the optical path 35 through a right angle or 90 degree turn to array 50 on insertion of prism 56 into the optical path. Preferably, prism 56 is made integral with or attached in tight face to face contact with face 50' of array 50 to form a unitary structure.

The reading array/prism combination 50, 56 is supported adjacent to and in a position normally out of the optical path 35, the axis of reading array 50 in the scan or X direction being substantially parallel to the longitudinal axis of the row or rows of lens elements 41 that comprise array 40. A pair of side rails 58 are provided on each side of the reading array/prism combination 50, 56 for supporting reading array/prism combination, rails 58 serving as tracks within which the reading array/prism combination 50, 56 is supported for movement of prism 56 into and out of the optical path 35. A suitable driver such as solenoid 59 is provided for moving the reading array/prism combination 50, 56 between an inoperative position where prism 56 is out of the optical path 35 (FIG. 3) and an operative position where prism 56 is astride the optical path 35 (FIG. 2).

For operation in the WRITE mode, an image writing array 65, which may for example comprise a plurality of light emitting diodes or LEDs 66 supported on a suitable base or chip 68 is provided. LEDs 66 are disposed in one or more linear arrays or rows. As will be understood, image signals from a suitable source such as a data communication channel, memory, raster input scanner, etc. may be input to writing array 65 through input line 71, array 65 incorporating suitable circuitry including clock means to selectively actuate the LEDs 66 individually in response to the image signal input.

A right angle prism 70 is provided for transmitting the image rays generated by writing array 65 to lens array 40 and photoreceptor 12 at exposure station 16. Prism 70 is preferably disposed in face to face contact with writing array 65. Preferably, prism 70 is made integral with or attached directly to writing array 65 to form a unitary structure.

The writing array/prism combination 65, 70 is supported adjacent to and in a position so that prism 70 is normally out of the optical path 35, the axis of array 65 in the scan or X direction being substantially parallel to the longitudinal axis of the row or rows of lens elements 41 that comprise array 40. A pair of side rails 72 are provided on each of the writing array/prism combination 65, 70, rails 72 providing tracks within the array/prism combination 65, 70 is slidably supported for movement thereof from a position where prism 70 is outside of the optical path 35 (FIG. 2) to a position where prism 70 is astride the optical path 35 (FIG. 3). A suitable driver such as solenoid 69 is provided for selectively moving the writing array/prism combination 65, 70 into and out of the optical path 35.

Figure 4:
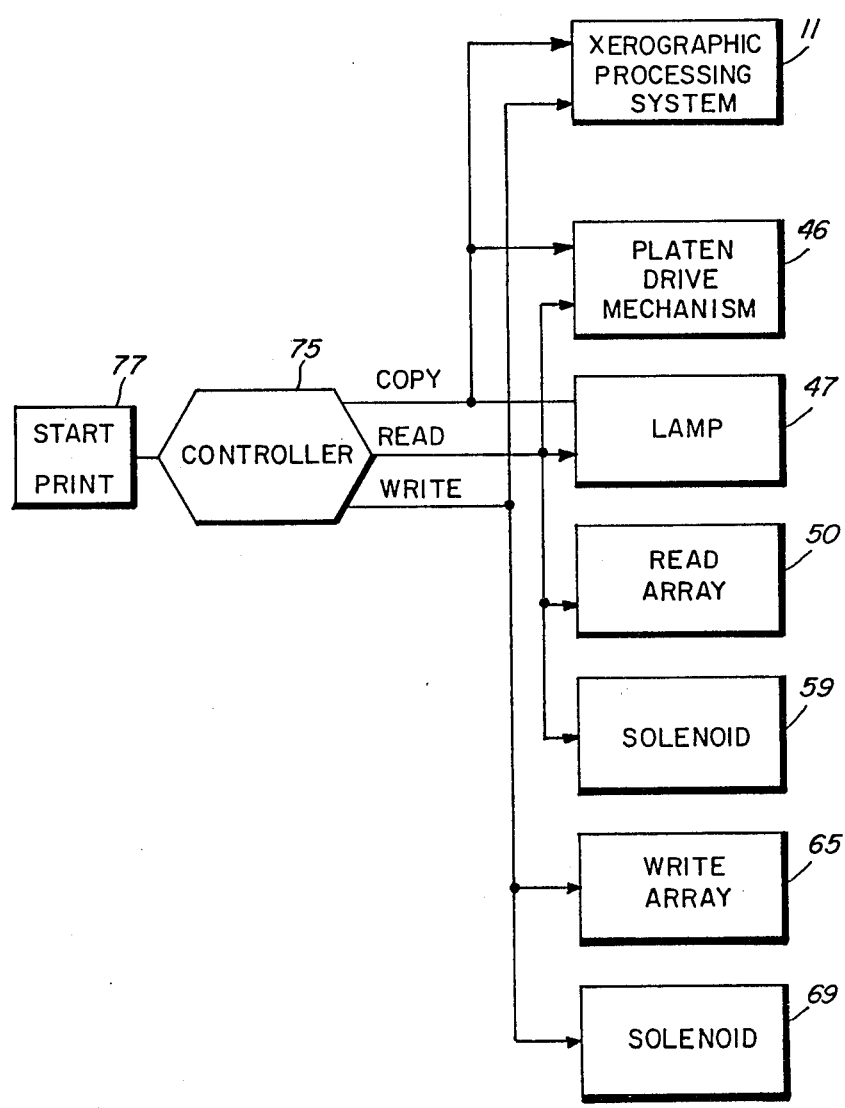
FIG. 4 is a schematic showing the control elements for effecting selective operation of the machine in the copy, read, or write modes selectively.

Referring particularly to FIG. 4 of the drawings, a suitable controller 75 is provided to enable the operator or user to select the mode of operation of printer 10. Controller 75 controls operation of xerographic processing system 11, platen drive mechanism 46, lamp 47, image reading array 50, solenoid 59, writing array 65, and solenoid 74 in accordance with the operational mode selected. A suitable Start/Print control 77 is provided for actuating printer 10 following readying thereof as will appear.

OPERATION

While operation of printer 10 in the COPY mode is desired, controller 75 is placed in the COPY position and the document original 43 to be copied is placed on platen 42 by the operator or user. In this disposition, controller 75 readies the xerographic processing system 11, platen driver 46, and lamp 47 for operation. On actuation of Start/Print control 77, the xerographic processing system 11 is actuated and photoreceptor 12 moves in the direction shown by the solid line arrow in FIG. 1. Concurrently, corotron 16 is energized to place a uniform charge on photoreceptor 12 preparatory to imaging, magnetic brush 21 is energized to bring developing material into developing relationship with photoreceptor 12 to develop the latent electrostatic images formed on photoreceptor 12, transfer corotron 25 is energized to transfer images developed on photoreceptor 12 to copy sheets 24 brought forward from tray 25 by feed roll 27 and pinch roll pairs 29, cleaning brush 33 is energized to remove any leftover developer materials from photoreceptor 12, and fuser 30 is energized to fuse the image bearing copy sheets 24. Platen drive mechanism 46 is actuated to move platen 42 and the document original 43 thereon past scan point 44 and lamp 47 is energized to illuminate a line-like portion of the document original 43 at scan point 44.

The image rays reflected from the document are transmitted by lens array 40 to photoreceptor 12 at exposure station 14 to expose the moving photoreceptor line by line and create a latent electrostatic image of the document original 43 on photoreceptor 12. The electrostatic image created on photoreceptor 12 is thereafter developed by magnetic brush 21 and transferred to the copy sheet 24 brought forward from tray 21 at transfer station 22. The copy sheet, bearing the developed image, is thereafter fused by fuser 30 and discharged into output tray 31.

For operation in the READ mode, and referring particularly to FIGS. 2 and 4 of the drawings, controller 75 is set to the READ position to energize solenoid 59 and move the reading array/prism combination 50, 56 forward so that prism 50 is placed astride the optical path 35. Concurrently therewith, platen drive mechanism 46, lamp 47, and reading array 50 are enabled. Following placing of the document original 43 to be read on platen 42, the use or operator actuates Start/Print control 77 to actuate platen drive mechanism 46, lamp 47 and reading array 50. Platen 42 carries the document original past scan point 44, the image rays reflected from the document line being transmitted by lens array 40 to prism 56 and from prism 56 to reading array 50. Scanning elements 52 generate electrical signals, the potential of which is proportional to the image gray levels. The image signals produced by reading array 50 are passed via output line 55 to the user.

For operation in the WRITE mode, and referring particularly to FIGS. 3 and 4 of the drawings, controller 75 is set to the WRITE position to energize solenoid 74 and move the writing array/prism 65, 70 forward so that prism 70 is placed astride the optical path 35. Concurrently therewith, the xerographic processing system 11 and writing array 65 are readied for operation. On actuation of Start/Print control 77, the xerographic processing system 11 and writing array 65 are actuated. The image signals input to writing array 65 from the remote source selectively actuate the individual LEDs that comprise writing array 65 to generate a line-like light image in accordance with the image signal content. The image rays output by array 65 pass via prism 70 to lens array 40 and through lens array 40 to exposure station 16 and photoreceptor 12. The latent electrostatic image created on photoreceptor 12 is thereafter developed by magnetic brush 21 and transferred at transfer station 23 to the copy sheet 24 brought forward by sheet feed roll 26 and pinch roll pairs 29. Following transfer, the copy sheet bearing the developed image is fused by fuser 30 and the finished copy deposited in output tray 31.

While optical prisms 56, 70 are described and shown herein, other types of reflective surfaces such as mirrors may instead be envisioned. And while 90° or right angle optical elements such as prisms 56, 70 are shown and described herein, other angular relationships between lens array 40 and reading and writing arrays 50, 65 respectively may be contemplated.

While the invention has been described with reference to the structure disclosed, it is not confined to the details set forth, but is intended to cover such modifications or changes as may come within the scope of the following claims.

I claim:

1. In a reproduction machine selectively operable in a first mode to produce copies of image originals, in a second mode to convert image originals to image signals, and in a third mode to produce copies from image signals, said reproduction machine having a xerographic system for processing images including a movable photoreceptor, means to charge the photoreceptor preparatory to imaging, an exposure station where said photoreceptor is exposed, means for developing images on said photoreceptor, means for transferring developed images from said photoreceptor to copy substrate material, and platen means for supporting image originals, the combination of:
   (a) a lens array comprising a preset number of individual lens elements arrayed in at least one row, said lens elements cooperating to form at least one line-like optical path between said platen means and said photoreceptor for transmitting images from the image original on said platen means to said exposure station and said photoreceptor in said first mode;
   (b) an image reading array having a plurality of image sensing elements;
   (c) a first optical element selectively insertable into said optical path between said reading array and said lens array to optically couple said reading array with said lens array for transmitting images from the image original on said platen means to said reading array in said second mode;
   (d) an image writing array having a plurality of individually controllable exposure elements;
   (e) a second optical element selectively insertable into said optical path between said writing array and said lens array to optically couple said writing array with said lens array for transmitting images output by said writing array to said exposure station and said photoreceptor in said third mode; and
   (f) control means for selectively operating said machine in one of said first, second, or third modes, said control means including means for actuating said first and second optical elements to insert the selected one of said first and second optical elements into said optical path when operating said machine in said second and third modes respectively.

2. The reproduction machine according to claim 1 in which said first and second optical elements comprise prisms.

3. The reproduction machine according to claim 2 in which said prisms are integral with said reading and writing arrays.

4. In a multimode reproduction machine having a movable photoreceptor, means to charge the photoreceptor in preparation for imaging, exposure means for exposing the photoreceptor, developer means for developing images formed on the photoreceptor, transfer means for transferring developed images from the photoreceptor to a copy substrate, a platen for supporting a document to be scanned, and lamp means for illuminating at least the portion of the document on the platen being scanned, the combination of:

(a) a first linear array of individual optical elements disposed between said platen and said photoreceptor forming an optical path for transmitting image rays from said document to said photoreceptor at said exposure station whereby in a first copy mode said document is scanned and the image rays transmitted by said optical elements to said exposure station to expose said photoreceptor and create an electrostatic image of said document on said photoreceptor;

(b) a second linear array of discrete image sensing elements disposed outside of said first array optical path between said first array and said photoreceptor, the optical path of said second array being substantially normal to said first array optical path;

(c) a first prism adapted when actuated to optically couple said first array optical path with said second array optical path whereby in a second copy mode said document is scanned and the image rays transmitted by said first array and said first prism to said second linear array;

(d) a third linear array of discrete exposure elements disposed outside said first array optical path between said platen and said first array, the optical path of said third array being substantially normal to said first array optical path; and (e) a second prism adapted when actuated to optically couple said first array optical path with said second array optical path whereby in a third copy mode image rays produced by said third array are transmitted by said second prism and said first array to said exposure station to expose said photoreceptor and create an electrostatic image thereon.

* * * * *